United States Patent [19]

Siebert

[11] 4,309,108

[45] Jan. 5, 1982

[54] ANALYZER FOR COHERENT RADIATION

[75] Inventor: Edward T. Siebert, New Fairfield, Conn.

[73] Assignee: The Perkin-Elmer Corporation, Norwalk, Conn.

[21] Appl. No.: 9,220

[22] Filed: Feb. 5, 1979

Related U.S. Application Data

[63] Continuation of Ser. No. 760,061, Jan. 17, 1977, abandoned.

[51] Int. Cl.³ .................... G01B 9/02; G02B 27/14
[52] U.S. Cl. .................................. 356/352; 350/172
[58] Field of Search ..................... 356/352; 350/172

[56] References Cited

U.S. PATENT DOCUMENTS

| | | | |
|---|---|---|---|
| 587,443 | 8/1897 | König | 350/172 |
| 3,531,207 | 9/1970 | Lee | 356/352 |
| 3,824,018 | 7/1974 | Crane, Jr. | 356/352 |

*Primary Examiner*—John K. Corbin
*Assistant Examiner*—Bruce Y. Arnold
*Attorney, Agent, or Firm*—S. A. Giarratana; E. T. Grimes; T. P. Murphy

[57] ABSTRACT

Apparatus for detecting and/or determining the wavelength of coherent radiation in the presence of incoherent ambient radiation. The apparatus includes at least three unequal path interferometers with the radiation path length difference in each interferometer being substantially greater than the coherence length of the incoherent radiation, but substantially less than the coherence length of the coherent radiation, the average radiation path length in said three interferometers being different one from the others. The apparatus further includes detectors for detecting the radiation transmitted through each of the interferometers for generating signals corresponding to the radiation leaving each interferometer, and electronic processing elements to detect and determine the wavelength of the coherent radiation.

A preferred form of interferometer is a Fabry-Perot etalon having a plurality of regions of different thicknesses. The etalon has a first surface for receiving the radiation and a second surface spaced from the first surface, so that the radiation or optical path difference between the transmitted portions of radiation impinging on the first surface is substantially greater than the coherence length of the incoherent radiation, but substantially less than the coherence length of the coherent radiation.

28 Claims, 16 Drawing Figures

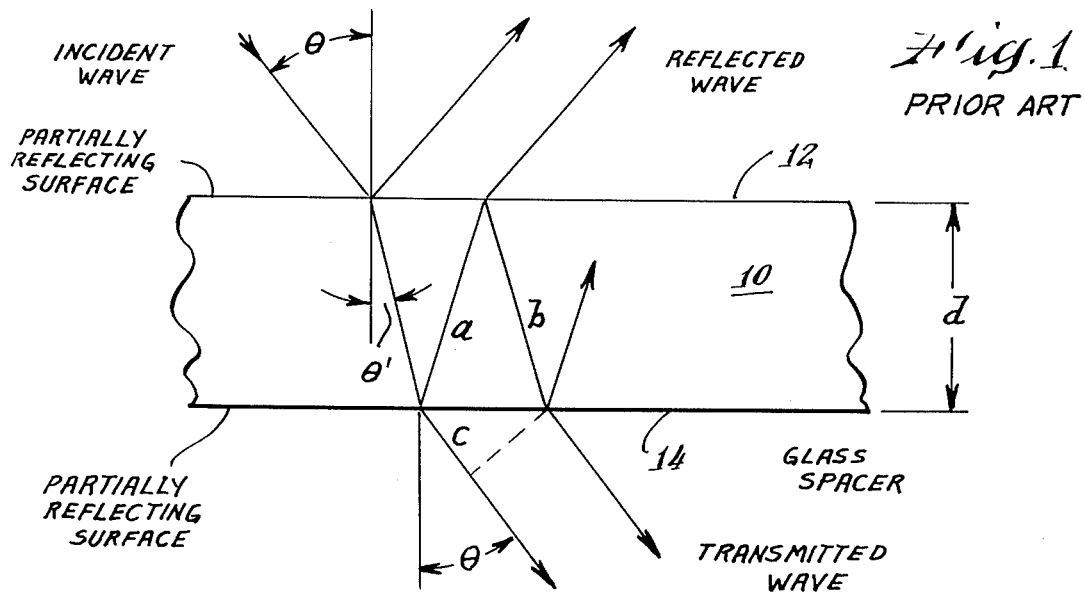
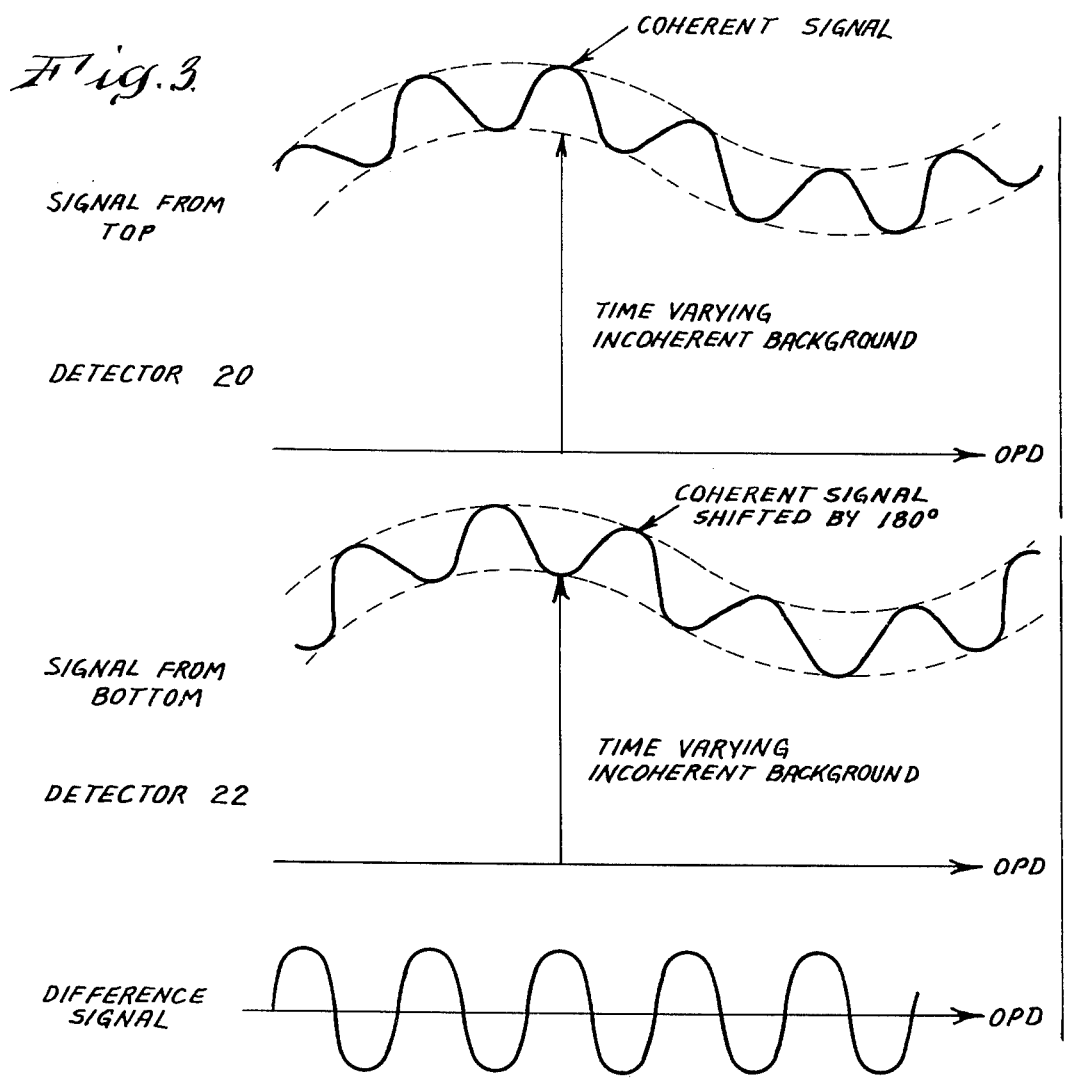

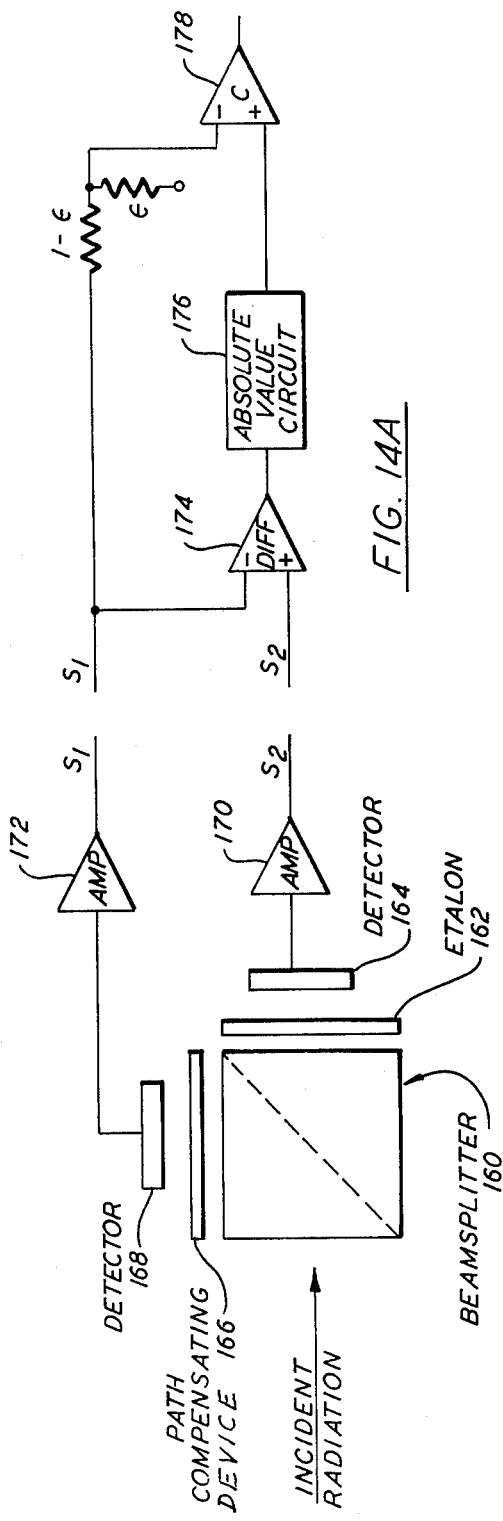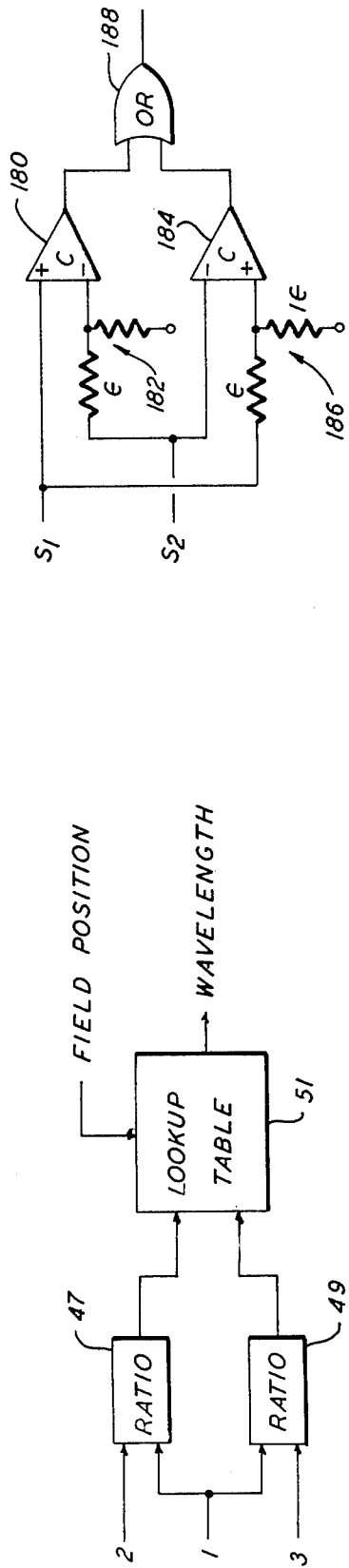

ANALYZER FOR COHERENT RADIATION

This is a continuation of application Ser. No. 760,061, filed Jan. 17, 1977 now abandoned.

BACKGROUND OF THE INVENTION

The present invention relates to unequal path interferometers, and more particularly to a plurality of associated unequal path interferometers. Interferometers constructed in accordance with the concepts of this invention are adapted, among other possible uses, for use in detecting, and determining the wavelength of coherent radiation, as from a laser, in a quantum of radiation including incoherent radiation. It is particularly adapted for discriminating coherent radiation from incoherent radiation, and determining wavelength, from a single pulse or from a continuous wave of the radiation. In addition, it is adapted to determine the relative angular position of the source of the radiation. A preferred form of the apparatus according to the invention includes a Fabry-Perot etalon having a plurality of regions of different thicknesses.

A Fabry-Perot etalon interferometer consists normally of two plane, parallel partially reflecting surfaces formed on a solid glass spacer so that one portion of incident radiation is transmitted directly through while other portions, being reflected between the partially reflecting surfaces before emerging, are transmitted over a longer path.

As described in U.S. Pat. No. 3,824,018 to R. Crane, and assigned to the same assignee as the present application, a Fabry-Perot etalon is adapted to discriminate coherent radiation by making the optical thickness of the glass spacer sufficiently less than the absolute coherence length of the incident radiation (ie. the absolute of the coherence length of the coherent and incoherent incident radiation) so that the absolute coherent length will be substantially less than the difference between the lengths of the paths of the directly and indirectly transmitted radiation (ie. the optical path difference or OPD). Then, by changing the path length, by means of tilting the etalon, the intensity of the incoherent radiation transmitted will remain constant, but the coherent radiation modulates. The intensity of radiation transmitted through the etalon is a function of the OPD and of the wavelength of the radiation. The OPD is a function of the index of refraction of the spacer, of the thickness of the spacer and the angle of refraction of the radiation passing through the interior of the spacer. As the etalon is tilted in a scanning mode at a predetermined rate to vary the optical path lengths, and the OPD, the intensity of the transmitted radiation, suitably detected by a photodetector at the back of the etalon, varies in a manner such that the frequency of the radiation as picked up by the detector decreases and reaches a minimum as the etalon swings through a position at which the angle of incidence of the impinging radiation, and hence the angle of refraction is zero. By this means the etalon is utilized to detect the relative position of the source of the coherent radiation. Additionally, this etalon may be used to determine the wavelength of the coherent radiation at a preselected scan rate with reference to coherent radiation of known wavelength and comparing the detected frequency-wavelength pattern with the pattern similarly produced by the coherent radiation whose wavelength is known.

The aforementioned patent also disclosed a two stepped etalon to, in effect, provide two etalon regions of different thicknesses. As disclosed, the thicknesses differ by a quarter wavelength of the wavelength of the coherent radiation to be detected so that the optical path differences of the two etalon regions differ by a half wavelength. A detector is provided for each of the two etalon portions. The output signals from the two detectors, which are made to be of opposite polarity are added, so that the constant output signal components produced by the incoherent radiation cancel out and the coherent radiation signals are accentuated. Otherwise, the detected output is analyzed in the same manner as described with reference to the single etalon embodiment.

While the device of the aforementioned patent operated with reasonable success in certain installations having a continuous wave source, my contribution to the art is a new etalon interferometer, which is an improvement over such prior devices, which is capable of processing a single pulse to distinguish the characteristics thereof, and which has other advantages, as will become apparent as the description proceeds.

SUMMARY OF THE INVENTION

One of the objects of the present invention is the provision of new and improved apparatus for detecting and/or determining the wavelength of coherent radiation in the presence of incoherent ambient radiation, which is compact, efficient, light weight and relatively inexpensive to fabricate.

Another object of the invention is the provision of apparatus of the aforesaid character, which covers a wide range of radiation fields and which has a wide field of view.

As yet another object of the invention, there is provided apparatus of the type described, which has high sensitivity and which may determine the relative angular position of the source of radiation.

To accomplish the foregoing and other objectives, the invention contemplates the provision of new and improved apparatus for determining the wavelength of coherent radiation in the presence of incoherent ambient radiation which, in one form thereof, comprises, in combination, at least three unequal path interferometer means with the radiation path length difference in each interferometer being substantially greater than the coherence length of the incoherent radiation, but substantially less than the coherence length of the coherent radiation. The average radiation path length in said three interferometer means is different one from the others. The apparatus further includes means for detecting the radiation transmitted through each of the interferometers and for generating separate first, second and third signals corresponding to the radiation leaving each of the interferometer means. In addition, the apparatus includes means for processing the signals through electronic processing elements to detect and determine the wavelength of the coherent radiation.

While the unequal path interferometers may take any one of a number of various different forms such as a Michelson or Fizeau, for example, a presently preferred from comprises a Fabry-Perot etalon having at least three regions of different thickness. The etalon has a first surface, positioned to receive coherent radiation, and a second surface. The average distance between the two surfaces is such that the radiation or optical path difference between the transmitted portions of radiation impinging on the first surface is substantially greater than the coherence length of the incoherent radiation, but substantially less than the coherence length of the coherent radiation.

According to one aspect of the invention, the means for processing the signals through the electronic processing elements to detect and determine the wavelength of coherent radiation comprises operative elements, which in one form thereof may include means for generating a fourth signal proportional to the difference between the first and second signals, and means for generating a fifth signal proportional to the difference between the second and third signals, and means for generating an output proportional to the ratio between the fourth and fifth signals.

According to another aspect of the invention, the means for processing the signals through the electronic processing elements to detect and determine the wavelength of coherent radiation comprises operative elements, which in one form thereof may include means for generating a fourth signal proportional to the difference between the first and second signals, and means for generating a fifth signal proportional to the difference between the second and third signals, and means for generating an output proportional to the ratio between the fourth and fifth signals.

According to another aspect of the invention, the means for processing the signals through the electronic processing elements to detect and determine the wavelength of the coherent radiation comprises digitally operative elements, which may include in one form thereof, a comparator associated with each two of said detectors, a plurality of coincident gates associated with the comparator, the number of said gates being one less than the number of comparators, for outputting a plurality-bit wavelength code. Preferably, the thickness of the etalon regions are preselected so the polarity reversals occur at different wavelengths, to thereby provide a binary code for the wavelength of the coherent radiation.

It will be appreciated that in some installations problems may occur due to atmospheric scintillation effects, which destroy the spatial coherence of the wavefront across the etalon. That is, a stepped-etalon system, of the type described hereinbefore, relies upon achieving coherent signal detection and absolute background and background scan noise (incoherent signal) rejection by means of balanced detectors and signal cancellation (subtraction) techniques. I have overcome or at least mitigated this problem in a new and improved manner. According to another aspect of the invention, I provide means for equalizing the radiation intensity between the pairs of detectors. The means for equalizing the radiation intensity between the detectors, in one form thereof is a beam-splitter wherein the radiation entering the beam-splitter is divided so that one portion passes through the beam dividing surface to a first one of the regions of the etalon and a second portion is reflected from the beam dividing surface to a second one of the regions of the etalon. Thus, a common aperture means is provided for directing radiation to all portions of the etalon. Preferably, the beam-splitter has a plurality of dots on the beam dividing surface, which are highly reflective and the spaces therebetween are highly transmitting, the size of the dots being preselected so that they are smaller than the atmosphere scintallation spatial structure. In another form of the invention, I equalize the radiation intensity between the detectors by means of providing an etalon having a plurality of regions of different thicknesses wherein the regions are in the form of a plurality of interdigitated steps. A plurality of detectors are provided corresponding in number to the etalon regions, said detectors having a plurality of interdigitated elements corresponding to the interdigitated steps of the etalon, that are adjacent or in contact therewith. The widths of the detector elements are preselected so that they are smaller than the atmosphere scintillation spatial structure.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which the disclosure is based may readily be utilized as a basis for the designing of other structures for carrying out the several purposes of the invention. It is important, therefore, that the claims be regarded as including such equivalent structures as do not depart from the spirit and scope of the invention.

Specific embodiments of the invention have been chosen for purposes of illustration and description, and are shown in the accompanying drawings, forming a part of the specifications.

BRIEF DESCRIPTION OF THE DRAWINGS

FIG. 1 is a diagram illustrating the geometry of a Fabry-Perot etalon;

FIG. 3 is a schematic illustration of the waveforms produced by the detector of FIG. 2;

FIGS. 5 and 5A are schematic illustrations of coherent radiation wavelength detector apparatus in accordance with the present invention;

FIGS. 14A and 14B illustrate apparatus to detect the existence of a coherent source in the presence of incoherent background.

DETAILED DESCRIPTION OF PREFERRED EMBODIMENTS

Figure 2:
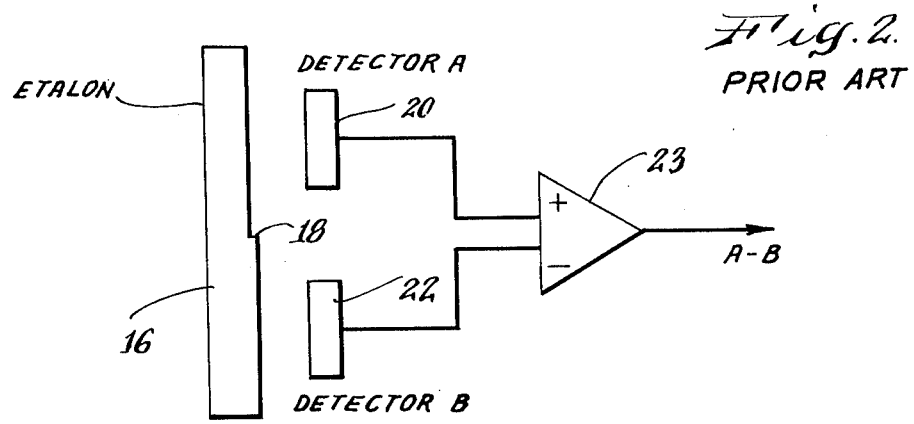
FIG. 2 is a schematic diagram of a single step etalon detector apparatus, such as is known to the prior art.

It will be appreciated that many different forms of unequal path interferometers may be employed to carry out the concepts of this invention, such as a Fabry-Perot, Michelson or Fizeau, for example. However, it is necessary to provide means for varying the radiation or optical path difference, as will be explained more fully hereinafter. It has been found that a Fabry-Perot interferometer or etalon is particularly desirable for carrying out the invention.

FIG. 1 illustrates the geometry of a Fabry-Perot interferometer or etalon. It comprises a flat glass spacer 10 having partially reflecting surfaces 12, 14. An incident wave has one component which is directly transmitted and another which is twice reflected. One beam path is determined by the distance a plus b. The second beam path is determined by the distance c. The optical path difference:

$$OPD = (a+b) - c \quad (1)$$

can be easily calculated from Snell's law ($\sin \theta = n \sin \theta'$) and the geometry of FIG. 1. It is found to be $$OPD = 2nd \cos \theta' = 2d(n^2 - \sin^2 \theta)^{\frac{1}{2}} \quad (2)$$

The transmission through the etalon is a function of both the angle $\theta$ and the wavelength $\lambda$ of the incident light. By summing the contributions to the transmitted wave from all possible multiple reflections and expanding, one obtains $$T_{FP} = \frac{T^2}{1 - R^2} \{1 + 2R \cos \phi + 2R^2 \cos 2\phi + 2R^3 \cos 3\phi + \ldots\} \quad (3)$$

where
$T_{FP}$ = transmission of Fabry-Perot etalon
R = reflectivity of etalon surfaces
$\phi = (2\pi/\lambda)$ OPD = optical phase difference
$\lambda$ = wavelength
T = transmission of etalon surface
n = index of refraction of etalon
$\theta$ = angle of incidence
$\theta'$ = angle of refraction (in etalon)

When R is close to unity, there are many multiple reflected wavelets contributing to the transmitted wave and the etalon is said to have high finesse. High finesse etalons are used for very narrow band spectral filters because of their narrow transmission characteristics as a function of wavelength. On the other hand, when reflectivity is moderate, the etalon is said to have low finesse. This type of etalon is best suited for detection of coherent radiation.

In order to have a high probability of detecting a short laser pulse, a detector must look in all directions and at all wavelengths all the time. This requirement necessitates that considerable background radiation must also be viewed. Natural background radiation may be diffusely reflected sunlight in the visible and near infrared, or thermal radiation in the far infrared. In addition, other spurious sources of radiation may also exist, such as specularly reflected sunlight, lightning flashes, and various manmade incoherent light sources. A useful detector must be able to distinguish between a coherent source and background and spurious radiations.

Properties that may be useful in distinguishing laser radiation from other radiations are listed in the following table:

| | SOURCE | | |
| --- | --- | --- | --- |
| | LASER | NATURAL BACKGROUND | SPURIOUS SOURCES |
| SPECTRAL COHERENCE (Single Wavelength) | Very High | Low | Low to Medium |
| Spatial Coherence (can be imagaged to a point) | Very High | Low | High |
| TIME VARIATIONS | Short Pulse to CW | Low Frequency | Short Pulse to CW |

All lasers exhibit high spectral and spatial coherence by their very nature. However, the time properties of the laser can be manipulated by the user. It is therefore desirable to use spectral and spatial coherence as the means of discriminating a laser from the background and to use time characteristics only to enhance the detection of specific types of lasers. The Fabry-Perot etalon provides a technique for using the spectral and spatial coherence properties of a laser to distinguish it from the background.

When a source is spectrally incoherent it emits light at many wavelengths. Therefore, to find the transmission of a Fabry-Perot etalon one must average over all wavelengths weighted by the spectral intensity. Referring to the series expansion for the transmission of a Fabry-Perot etalon, it is seen that when the spectrum of the source is broad (i.e., large variations in $\phi$), the oscillating terms in equation (3) will all average to zero. The transmission of the etalon will become a constant, independent of the optical path difference, i.e., independent of the angle, wavelength, and etalon thickness. Such a source will be unmodulated as these parameters are varied. It can be assured that $\phi$ will go through large variations for all but the narrowest of sources by merely making the etalon thickness, d, sufficiently large.

For a source to be "coherent," the variation in $\phi$ must be small (less than $\pi$). One can readily verify that the spectral width, $\Delta\lambda$, of the source must satisfy $$\Delta\lambda/\lambda < \lambda/4nd \quad (\cos \theta' 1)$$

For example, if nd is 1 mm, and $\lambda$ is 1 $\mu$m, the spectral width of the source cannot exceed 2.5 Å before the oscillating terms start to be averaged. As a practical matter, the etalon must not be so thick that the more incoherent lasers, such as GaAs, will be attenuated. A preselected thickness, depending upon the spectral range, is selected to allow such lasers to be modulated while still not modulating the background.

Although the background is not modulated by the Fabry-Perot etalon, it is still present in the form of a "constant" illumination. Variations in the level of background illumination cannot be distinguished from the modulation due to a laser source. Unless such background intensity variations can be removed, they present a serious limitation to the sensitivity of the sensor. The problem of background intensity variations (hereinafter called "scan noise" to distinguish them from shot noise) is not peculiar to the Fabry-Perot technique. It is present to some extent in all sensor systems that scan a nonuniform scene or view a fluctuating scene. It is a particularly important limitation in the detection of continuous or long pulse lasers.

The Fabry-Perot technique provides a simple means of reducing the background scan noise. FIG. 2 illustrates an etalon 16, having a step 18. As was pointed out above, the transmission of the Fabry-Perot etalon is constant for the incoherent background. Therefore, the background is transmitted equally through both halves of the etalon. By using two identical detectors 20, 22, one behind each half of the etalon, and differencing their outputs, the background level can be subtracted out. This technique can reduce the background level by more than two orders of magnitude. Scan noise is reduced by the same factor.

For coherent illumination, the transmission of the etalon is a function of the optical path difference (OPD). Therefore, the transmission through the two halves of the etalon can be made to be different by the proper choice of the OPD of the step. If we choose the step to have an OPD of approximately a half wavelength, then the transmission of the two halves of the etalon will be out of phase for coherent light. That is, if one side has maximum transmission, the other will have minimum transmission.

The signal levels from the two detectors 20, 22 are shown schematically in FIG. 3. The signals are passed through a differential amplifier 23. As a result, the out of phase coherent radiation is reinforced, while the in phase background is cancelled, as shown by the bottom curve. It will be seen that the stepped etalon technique provides a powerful method for reducing the scan noise by several orders of magnitude. This technique rejects incoherent sources no matter what their time characteristics may be. Thus, even short bursts of incoherent illumination from lightning, shell bursts, etc., will be suppressed. This is because the Fabry-Perot laser detector is truly a coherent light modulator and not just a radiometer.

DETERMINATION OF WAVELENGTH

The transmission of the Fabry-Perot etalon is wavelength dependent because the optical phase difference, $\phi$, is wavelength dependent. If $\phi$ could be measured, then the wavelength could be readily determined. However, one actually measures the transmission and, therefore, the cosine of $\phi$. Measuring the cosine of $\phi$ does not yield a unique value for $\phi$ because any multiple of $2\pi$ can be added to $\phi$ without changing the cosine.

Figure 4:
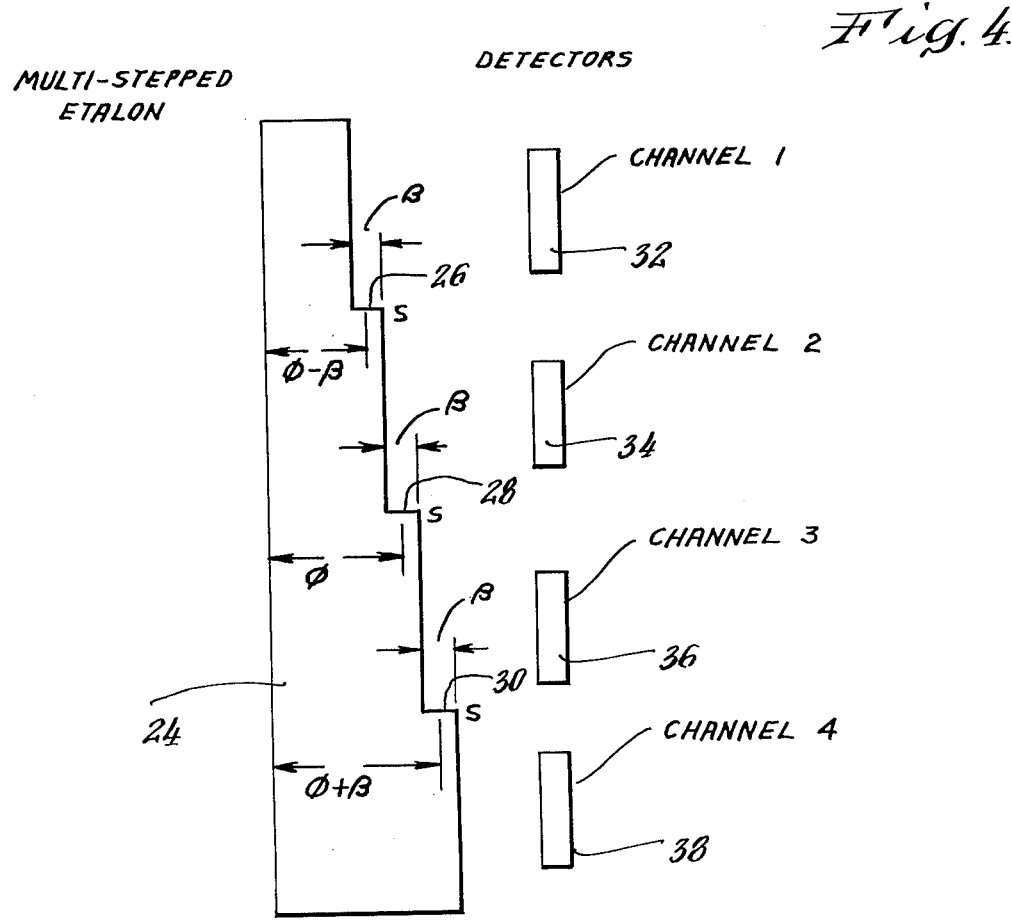
FIG. 4 is a schematic illustration of a Fabry-Perot etalon and detectors in accordance with the present invention.

This ambiguity can be overcome by measuring the change in $\phi$, rather than $\phi$ itself. This can be done by varying $\theta$ (i.e., scanning the etalon) or by varying the optical thickness "nd". When the laser radiation occurs in the form of short pulses, the scanning technique requires many pulses to unambiguously determine the wavelength. If wavelength is to be determined for a single short pulse of laser illumination, I have found it desirable to vary the etalon thickness rather than the angle. The thickness variation can be a simple step in the etalon as described above. While the addition of another step is sufficient to allow the wavelength to be determined, the addition of two steps preserves symmetry and provides redundancy. An etalon 24, having steps 26, 28, 30 and detectors 32, 34, 36, 38 is illustrated in FIG. 4.

To show how such an etalon can be employed to measure wavelength, consider the signals from each channel when the multistepped etalon 24 is illuminated by a laser radiation of intensity I.

Let $$\phi = \frac{4\pi nd}{\lambda} \cos\theta' \quad \beta = \frac{4\pi ns}{\lambda} \cos\theta' \qquad (4)$$

where:
d is the average thickness of the etalon
s is the height of each step
$\theta'$ is the angle of refraction in the etalon
n is the index of the etalon.

Then the signals from the various detectors can be written as (1) Detector 32 Signal = Background + $IT_{FP}(\phi - 3\beta/2)$ (5)
(2) Detector 34 Signal = Background + $IT_{FP}(\phi - \beta/2)$
(3) Detector 36 Signal = Background + $IT_{FP}(\phi + \beta/2)$
(4) Detector 38 Signal = Background + $IT_{FP}(\phi + 3\beta/2)$ The transmission of the etalon, $T_{FP}$, is approximately a constant plus an oscillatory function of $\phi$, as can be seen from equation (3). The only difference between signals from different channels is that the modulation of the coherent laser signal by the etalon has been shifted in phase. Taking the difference between adjacent channels nulls out the background and leaves only the coherent laser signal modulated by the differenced etalon transmission.

$$\begin{aligned}\text{Signal }(1-2) &= S_{12} = I\Delta\, T_{FP}(\phi-\beta,\beta) \\ \text{Signal }(2-3) &= S_{23} = I\Delta\, T_{FP}(\phi,\beta) \\ \text{Signal }(3-4) &= S_{34} = I\Delta\, T_{FP}(\phi+\beta,\beta)\end{aligned} \qquad (6)$$

These signals are also oscillatory in nature. By measuring the phase shift between channels, the value of $\beta$ can be determined. However, one must make the steps in the etalon sufficiently small, and in some cases it is desirable to keep $\beta$ less than $\pi$. This allows the wavelength to be determined unambiguously because arccosine B is a single valued function. The wavelength can then be determined from $$\lambda = 4ns\cos\theta'/\beta \approx 4ns/\beta \qquad (7)$$

when n and s are known quantities.

Because $\theta'$ is such a small angle, the cosine of $\theta'$ is very nearly unity. The cosine term can be set equal to unity for all but the largest fields of view. The error can be further reduced by using an average value for cosine $\theta'$.

It will be appreciated that instead of using an etalon having a plurality of steps to provide the optical path difference, it is also possible to use an etalon having regions fabricated of different materials to thereby vary the index (n) of the etalon or it is possible to vary the cosine $\theta'$ factor by using etalons at different angles of incidence or by changing $\theta'$ with time (scanning) the etalon to thereby provide an optical path difference.

ANALOG APPARATUS FOR DETERMINING WAVELENGTH

For purposes of illustrating the apparatus, an example apparatus will be described for the 0.4 to 1.1 $\mu$m spectral region. It will be appreciated that the apparatus can be used in other spectral regions by suitably changing the material and dimensions.

Figure 5:
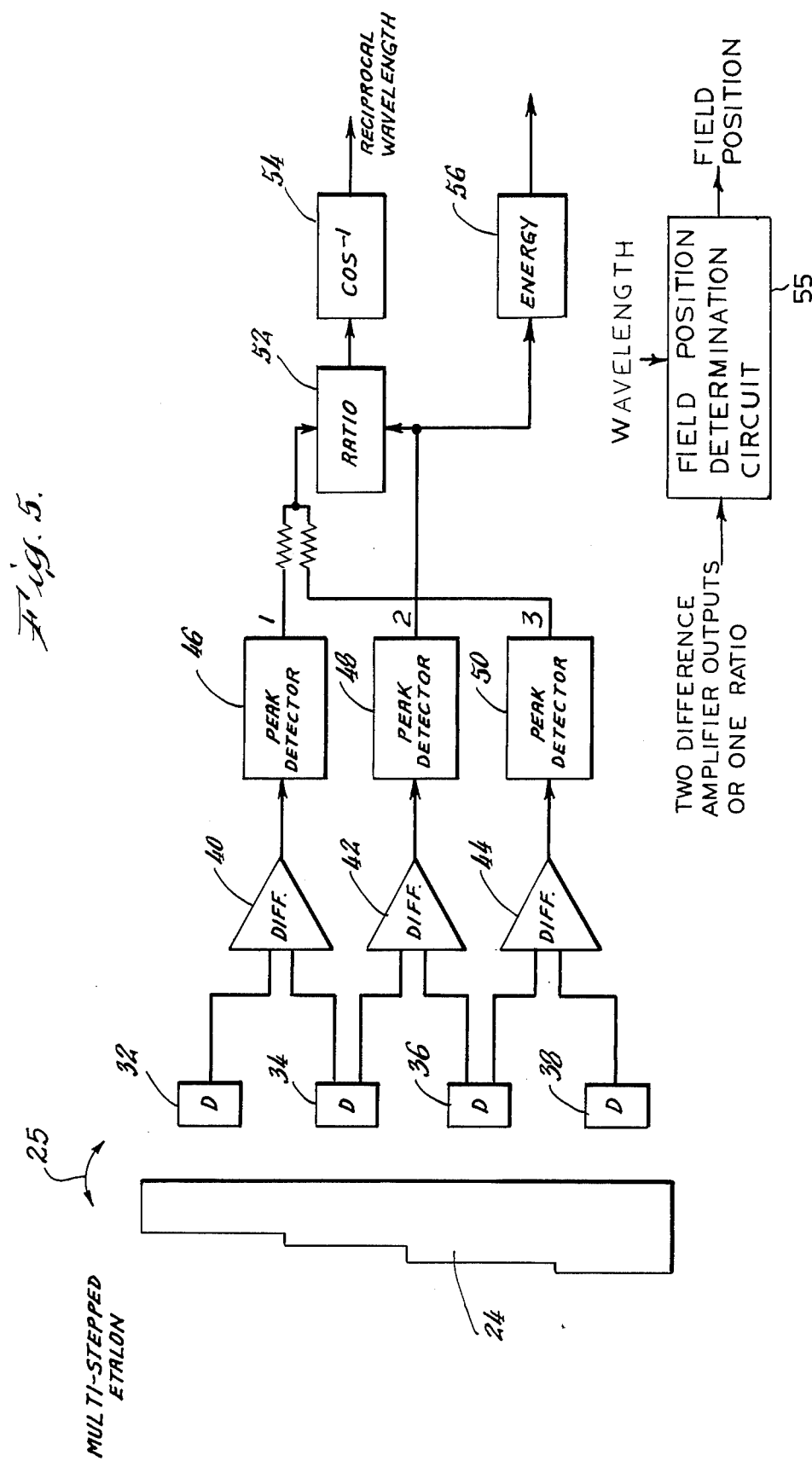

FIG. 5 schematically illustrates analog circuitry for detecting the wavelength of coherent radiation. A multiple step solid etalon 24 is employed. This may be approximately 50 μm thick, in the 0.4 to 1.1 μm region, for example. It has four parts, each of slightly different thickness. In this example, the steps are approximately 0.1 μm. When the etalon 24 is illustrated by a single short pulse of laser radiation, the output of each of the four optical detectors 32, 34, 36, 38 is likewise just a short pulse. These pulses are subtracted by difference amplifiers 40, 42, 44. The difference signals pass to peak detectors 46, 48, 50 where they are converted into levels that are held long enough to be further processed by the electronics. For each pulse that is detected, three signal levels are thus generated, corresponding to the three differences between adjacent channels. There are two simple ways to convert these levels into wavelengths.

If R is made sufficiently small that the higher terms in equation (3) are small, and can be neglected, $T_{FP}$ can be considered to be sinusoidal in nature. Neglecting all terms of $R^2$ and higher order gives for the difference:

$$S_{12} = 4I \frac{(1-R)}{(1+R)} R \sin \beta/2 \sin (\phi - \beta) \quad (8)$$
$$S_{23} = 4I \frac{(1-R)}{(1+R)} R \sin \beta/2 \sin (\phi)$$
$$S_{34} = 4I \frac{(1-R)}{(1+R)} R \sin \beta/2 \sin (\phi + \beta)$$

Then by forming the ratio $$(S_{12}+S_{34})/2S_{23} = \cos \beta \quad (9)$$

$\beta$ and $\lambda$ can be determined. To determine the wavelength unambiguously the steps in the etalon can be made sufficiently small that $\beta$ is always less than $\pi$. Specifically, for the 0.4 to 1.1 μm region, $\beta$ is restricted to $$55° \leq B \leq 150° \quad (10)$$

where the arccosine function is most linear.

This method makes the calculation of wavelength extremely simple and is easily implemented as shown in FIG. 5. The outputs of peak detectors 46 and 50 are summed. A conventional ratio module 52 provides a signal corresponding to cos $\beta$. This is converted to reciprocal wavelength by a conventional arccosine module 54. An energy level circuit 56 may also be employed to measure pulse energy. To make the higher order terms sufficiently small to achieve good accuracy, some sensitivity must be sacrificed by making R small. The optimum value for R is 41% to 50%. If only coarse wavelength is desired, or if reduced sensitivity is tolerable, this method is very simple to implement as real-time hardware.

If R is chosen to have its optimum value of 41%, then equation (6) is not easily solved for cosine of $\beta$. Nevertheless, since there are three equations, the value of $\beta$ can be uniquely determined. One way of determining $\beta$ is to form two ratios, such as $S_{23}/S_{12}$ and $S_{34}/S_{12}$. As best seen in FIG. 5A, the outputs 1, 2 and 3 from peak detectors 46, 48 and 50 (FIG. 5) are fed to radio modules 47 and 49. For every pair of ratios there exists a unique value of cosine $\beta$ and, therefore, of $\lambda$. To find this wavelength, a "lookup" table 51 is constructed. Then for each pair of ratios measured by the sensor, one simply looks up the correct wavelength in the table, just as one would look up a cosine function. If the field position is known, this information could be added to the lookup table to give the wavelength with greater accuracy. This is the preferred implementation.

For continuous wave (CW) signals, the phase shift between the various channels can be measured in the same manner as described above. If the sensor is scanned, the different signals will oscillate in time. The phase shift between the different channels can then be measured directly. This will allow a very accurate determination of wavelength. The frequency of the signal can be used to obtain location information.

DIGITAL APPARATUS FOR DETERMINING WAVELENGTH

It is noted that in the form of the invention illustrated in FIG. 5, analog ratios are computed to normalize the intensity of the light. All data are then extracted from the ratios that are proportional to the transmission of the etalon. I have found that it is possible to use digital signal processing techniques. If the difference in intensities across a step in the etalon is taken, the polarity of the signal is independent of the background intensity, as well as of the signal intensity. Changes in polarity are caused only by changes in the optical phase difference of the two coherent light paths. Furthermore, the phase differences are wavelength-dependent, being the product of the optical path difference and $2\pi/\lambda$. By measuring the polarities across many steps, all having the same average thickness, it is possible to form a very simple algorithm for determining the polarity of each cos $\beta_i$ where $\beta_i$ is the phase difference across the $i^{th}$ step. If n polarities are measured, the wavelength region can be divided into $2^{n-1}$ bins.

Figure 6:
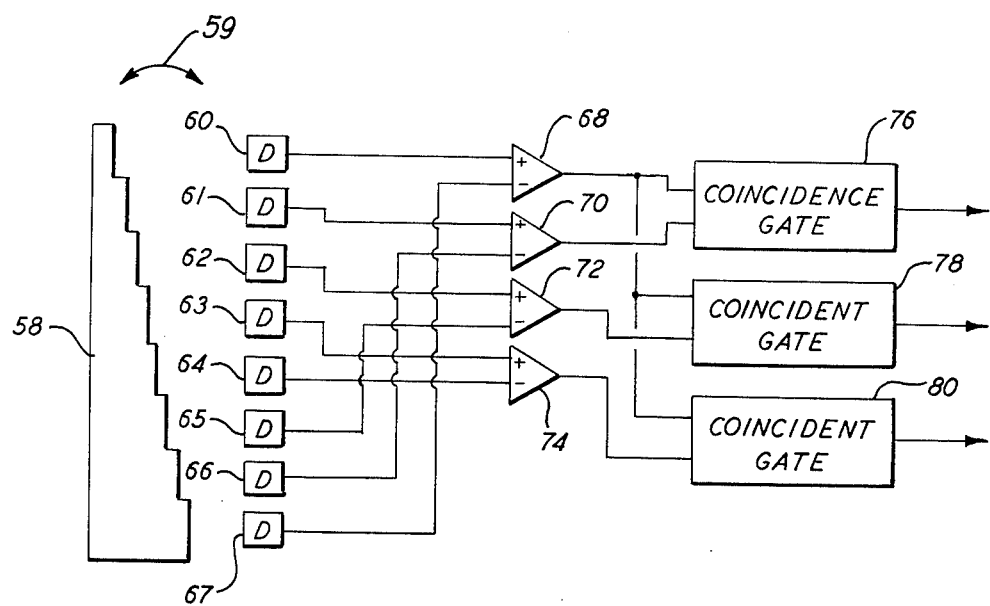
FIG. 6 is a schematic illustration of coherent radiation wavelength detector apparatus similar to FIG. 5, but showing another embodiment of the invention.
Figure 7:
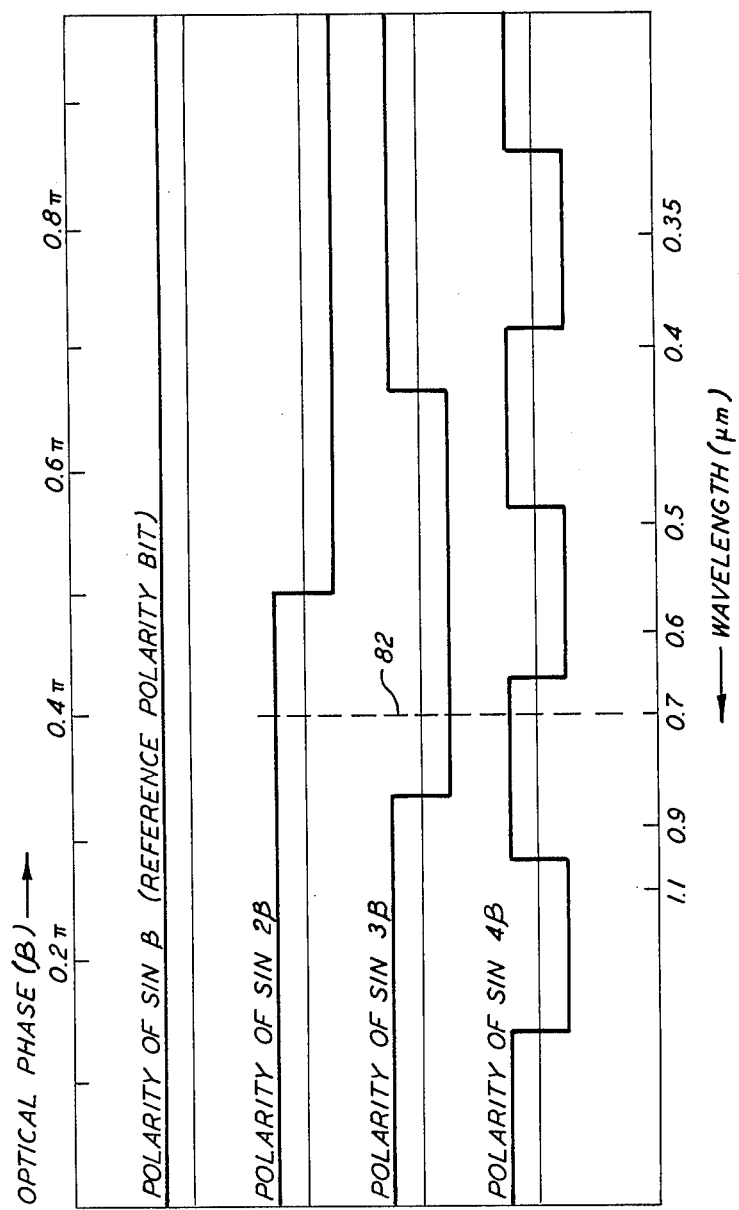
FIG. 7 is a graphic representation of the detected radiation polarity for the various etalon steps, of the detector apparatus of FIG. 6.

Referring to FIG. 6, there is illustrated a digital etalon embodiment, which comprises a multiple stepped etalon 58 having, for example, eight parts or bins, each of slightly different thickness. A detector is provided corresponding to each of the bins, as indicated at 60 to 67. In this embodiment the electronics required to determine wavelength comprises four comparators 68, 70, 72, 74 to determine the polarities, detectors 60 to 67 being applied to comparator 68, detectors 61 and 66 being applied to comparator 70, detectors 62 and 65 being applied to comparator 72, and detectors 63 and 64 being applied to comparator 74. The outputs from the comparators 68 and 70 are connected to a coincidence gate 76 and the outputs from the comparators 68 and 72 are connected to a coincidence gate 78, while the outputs from comparators 68 and 74 are connected to a coincidence gate 80. The three coincidence gates serve to compute a three-bit wavelength code. It will be appreciated that the etalon step heights are chosen according to a so-called gray code scheme, as shown in FIG. 7, so that the polarity reversals occur at different wavelengths and provide a digital code for the wavelength. For example, if the output from gate 76 indicates positive, the output from gate 78 indicates negative and the output from gate 80 indicates positive, then the wavelength is in the range of between about 0.66 and 0.85 μm. as indicated by the broken line 82 in FIG. 7.

This digital etalon device encompasses a number of salient features, as follows:

(1) The ability to compute wavelength of coherent signals accurately even when simultaneous incoherent background variations exceed the coherent signal level, because the background-balancing concept provides a hundredfold reduction of background-caused errors;

(2) Real-time wavelength computation, applicable to both CW and signal pulse laser illumination;

(3) All digital electonics after the input comparators;

(4) Very simple electronics as compared to analog circuitry;

(5) Accuracy determined by the number of steps in the etalon instead of by the linearity of the electronics;

(6) Greater dynamic range in electronic circuitry;

(7) Can detect fast and less definite pulses;

(8) Very broad spectral coverage;

(9) Very wide field of view; and

(10) Very fast electronic circuitry can be used.

FIELD POSITION DETERMINATION

The angle of incidence or field position can be determined by detecting the change in $\cos \phi$ as the angle of incidence is varied, as by the movement of the vehicle if the etalon is mounted on a moving vehicle or by modulating (scanning) the etalon as indicated by arrow 25 in FIG. 5. It is noted that because there are many angles of incidence that can give the same value of $\cos \phi$, (since $\phi$ is typically several hundred radians, there are therefore many possible values for $\phi$ which give the right value for $\cos \phi$ and a value of $\theta$ that is in the field of view.) However, by changing the angle of incidence slightly so that $\phi$ changes, it is possible to calculate the angle of incidence by the formula:

$$\Delta\phi = (4\pi\Delta \cos \theta')/\lambda \approx 4\pi d/n\lambda \quad \sin \theta \Delta\theta$$

by Snell's law where $\lambda$ has already been determined. This is implemented, as seen in FIG. 5 by a field position determination circuit 55, whose inputs are either a ratio ($S_{23}/S_{12}$ or $S_{34}/S_{12}$) or any two of the difference amplifier outputs 40, 42, 44, and another input is the previously determined wavelength from the arccosine module 54 output. The $\phi$, $\Delta\phi$ and $\theta$ are calculated as the angle $\theta$ is varied in a predetermined systematic manner. The output from the field position determination circuit is a signal indicative of the field position of the coherent radiation source on a desired scale of measurement. It will be appreciated that the field position can also be determined in a like manner with the embodiment of the invention illustrated in FIG. 6, by tilting the etalon as indicated by arrow 59 in FIG. 6 in a predetermined systematic manner and using the output from comparator 68, and the previously determined wavelength. To correct the originally calculated wavelength, the new value obtained for $\theta$ can be used.

It can also be appreciated that if another etalon region were to be included in the apparatus at some predetermined angle, $\Delta\theta$ to the other etalons described then the angle of incidence, $\theta$, can be computed for a single pulse of radiation. Two such additional etalons can be used to provide accurate source field position determination by determining $\theta_x$ and $\theta_y$.

ATMOSPHERIC SCINTILLATON REDUCTION APPARATUS

Figure 8:
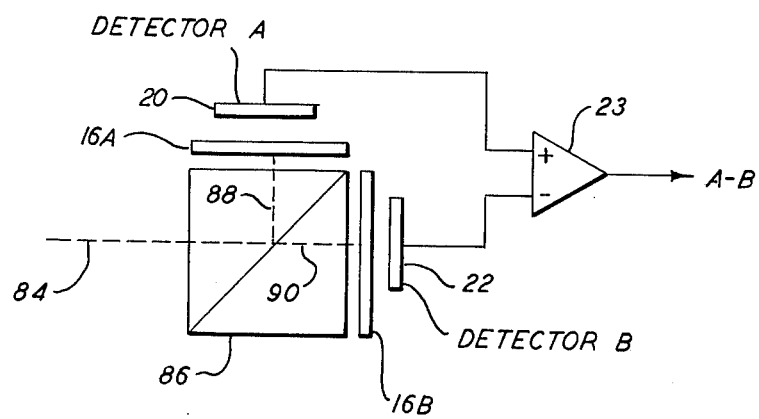
FIG. 8 is a schematic illustration of a beam-splitter employed in association with the single step etalon detector apparatus of FIG. 2, according to the present invention.

It will be appreciated that in some installations problems may occur due to atmospheric scintillation effects, which destroy the spatial coherence of the wavefront across the etalon. Differential atmospheric scintillation causes the intensities of laser and "point source" backgrounds to differ from detector to detector. While this is not a serious limitation in high flying aircraft, where atmospheric scintillation is spacially well correlated, it is an important limitation for low flying aircraft or ground systems. At ground level the spatial correlation distance of sunlight is of the order of a mere seven millimeters. I have found that this problem can be overcome by making all the detectors view the scene through a common aperture so that the light intensities incident on all of the parts of the etalon are identical. This concept is applicable to a two step etalon, as illustrated in FIG. 2, as well as to multiple stepped etalons, as illustrated in FIGS. 5 and 6. FIG. 8 shows a common aperture added to the etalon arrangement of FIG. 2. In this embodiment an incident wave 84 enters the system through a beam-splitter 86 so that a first portion 88 is reflected upwardly to one half 16A of the etalon and the second portion 90 passes through to the second half 16B, which has a different thickness, as compared to the first half. As described hereinbefore in connection with FIG. 2, two identical detectors 20 and 22 are disposed behind the etalon halves, respectively, and the signals therefrom are passed through the differential amplifier 23. As a result the light intensities incident on all portions of the etalon are equalized. In all other respects this etalon arrangement operates in the same manner as the embodiment of FIG. 2, including the removal of the background noise, as illustrated in the bottom curve of FIG. 3.

Figure 9:
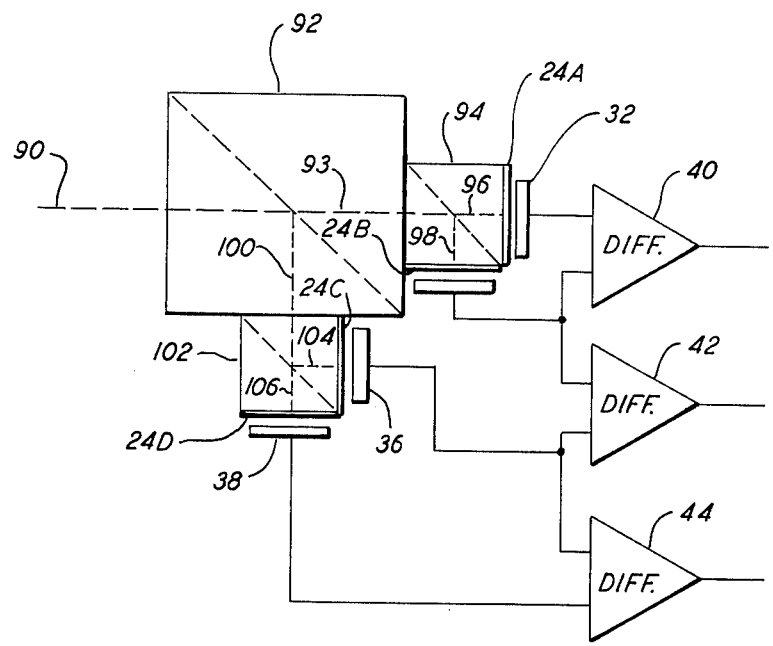
FIG. 9 is a schematic illustration of a plurality of beam-splitters employed in association with the coherent radiation wavelength detector apparatus of FIG. 5.

Considering next FIG. 9, this figure illustrates a common aperture added to the etalon arrangement of FIG. 5. In this embodiment the incident light wave 90 enters the system through a first beam-splitter 92 so that a first portion 93 passes through to a second beam-splitter 94 which again splits the beam into one portion 96 that passes to part one 24A of the etalon and another portion 98 that is reflected to part two 24B of the etalon. The second portion 100 from the first beam-splitter 92 is reflected to a third beam-splitter 102, which again splits the beam into one portion 104 that is reflected to part three 24C of the etalon and another portion 106 that passes through to part four 24D of the etalon. As described hereinbefore in connection with FIG. 5, four identical detectors 32, 34, 36 and 38 are disposed between the etalon parts, respectively, and the signals therefrom are subtracted by the difference amplifier 40, 42, and 44. As a result the light intensities incident on all portions of the etalon are equalized. In all other respects this etalon arrangement operates in the same manner as the embodiment of FIG. 5. It will be appreciated that in a like manner, according to the invention, beam-splitter could be added to the etalon arrangement of FIG. 6.

Figure 10:
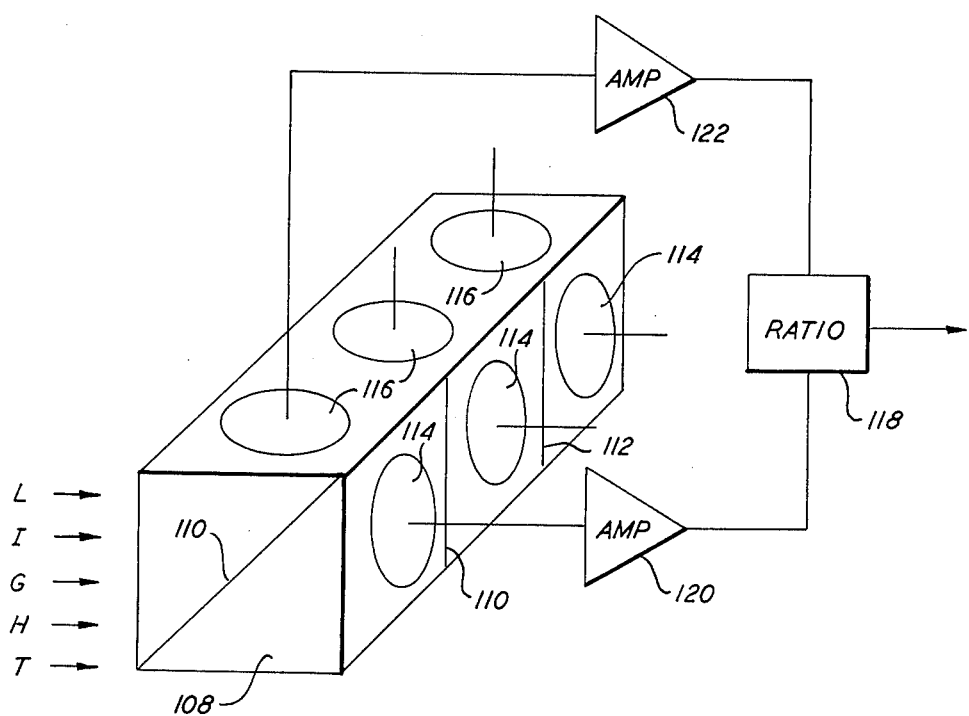
FIG. 10 is a schematic illustration of a module type beam-splitter in association with a coherent radiation wavelength detector apparatus, according to another form of the invention.

Another means of eliminating scintillation effects due to varying intensities, as viewed by the different detectors, is to normalize the intensity output. As best seen in FIG. 10, this is effected by providing a reference detector for each section of the etalon to normalize out the intensity. The etalon is in the form of a module 108, which has a beam-splitting surface 110 extending for the length thereof. On one face of the module there is a three part etalon with steps 110 and 112, and etalon detectors 114 are disposed behind the etalon parts, respectively. Behind the upper face of the module 108, reference detectors 116 are positioned to correspond to the etalon detectors 114, respectively. Each of the etalon detectors 114 is connected to a ratioing element 118 through an amplifier 120, and each of the reference detectors 116 is connected to the corresponding ratioing element 118 through amplifiers 122. The reference detector 116 for each section of the etalon serves to normalize out the scintillated intensity. Since both the reference channel and the etalon channel are scintillated in phase and at the same amplitude the result is scintillation cancellation and a scintillation noise-free coherent signal. The output from the three (one being shown) ratioing elements 118 is processed through electronic signal processing elements to determine the real time wavelength by the aforementioned equation (7) and position by equation (11).

Figure 11:
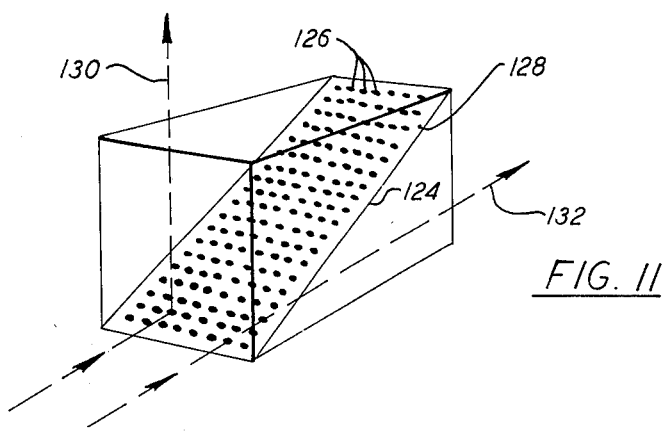
FIG. 11 is a schematic illustration of a beam-splitter constructed, in accordance with the concepts of this invention, for use in conjunction with the embodiments of FIGS. 2, 5, 6 and 10.

It has been found that atmospheric scintillation produces large intensity fluctuations of the signal, and when the detector size is relatively small compared to the spatial redistribution of the coherent wavefront, or where multiple detectors are used with significant (millimeter) spatial separation between them, difficulties may be experienced, because the stepped etalon system relies upon achieving coherent signal detection and absolute background and background scan noise (incoherent signal) rejection by means of balanced detectors and signal cancellation (subtraction) techniques. I have overcome this problem, in one form of the invention by the provision of a new and improved beam-splitter, as illustrated in FIG. 11. This beam-splitter has a beam dividing surface, indicated generally at 124, which comprises a plurality of dots 126 that are of substantially one hundred percent reflecting material with spaces 128 therebetween that are of substantially one hundred percent transmitting material. Thus, the radiation entering the beam-splitter which strikes the dots is reflected upwardly as indicated by the broken line 130, and the radiation which strikes between the dots passes through as indicated by the broken line 132. The size of the dots is selected so that they are smaller than the atmosphere scintillation spatial structure, and the dot spacing is selected so as not to be so small as to behave like a diffraction grating and diffract the light beyond the instantaneous acceptance angle of the etalon. For example, the dots may have a diameter of the order of about 8 mils and they may be positioned on about 10 mil centers. The beam splitter of FIG. 11 may be employed as the beam-splitter 86 in FIG. 8, the beam-splitters 92, 94 and 102 of FIG. 9, or the beam-splitter 108 of FIG. 10. It should be appreciated that this beam-splitter provides a constant division of the light, independent of the wavelength, polarization, and angle of incidence over a very wide field of view and a broad spectral region.

Figure 12:
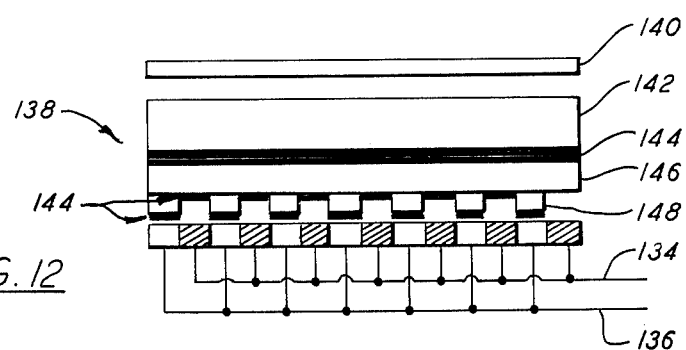
FIG. 12 is a schematic illustration of an interdigital type of coherent radiation wavelength detector apparatus according to another form of the invention.
Figure 13:
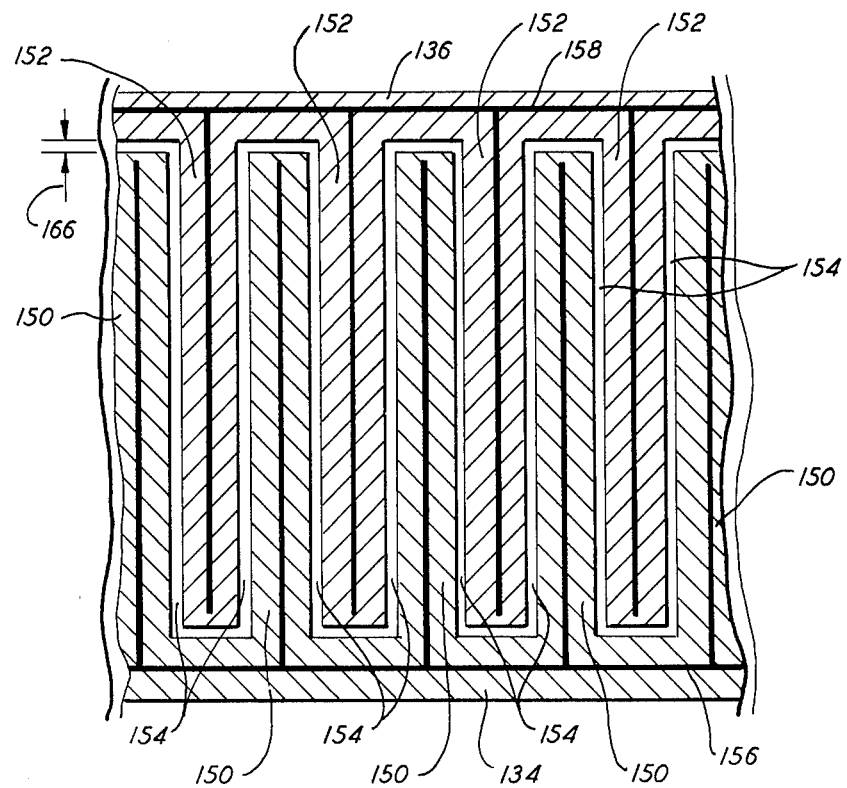
FIG. 13 is an enlarged plan view of the interdigital detector array of the embodiment of FIG. 12.

FIGS. 12 and 13 illustrate another form of the invention, which also provides immunity to atmospheric induced intensity scintillation. This is an alternate to the beam-splitter forms illustrated in FIGS. 8–11 and provides the advantages of being less bulky, less expensive and has a larger field of view. The concept involves creating small optical division elements at the plane of the etalon/detector and to aperture sample the wavefront essentially at that plane. A plurality of independent detectors, two being illustrated at 134, and 136, having very narrow interdigitated elements are arranged to sample the wavefront on a small scale as compared to the atmospheric scintillation structure, and are differenced to subtract out the background. The etalon assembly, indicated generally at 138, is also interdigitated and is mounted closely adjacent or in contact with the detectors. As best seen in FIG. 12, the etalon assembly comprises a window 140, a substrate 142 a reflective layer 144, an etalon spacer 146 and step zones 148 and another reflective layer 144. The width of the glass steps 148 is determined by a compromise, as larger elements reduce possible edge slope effects of the etalon and permit easier fabrication whereas smaller elements reduce the scintillation effects. A width of the order of about 100 to 120 $\mu$m has been found to be satisfactory, for example. However, the range of suitable widths extends substantially above and below the aforesaid 100 to 120 $\mu$m.

As best seen in FIG. 13, the interdigital detector array comprises the first detector 134 having a plurality of spaced fingers 150 and the second detector 136 having a like plurality of spaced fingers 152 interposed between the fingers 150, respectively, but spaced therefrom by small dead zones 154. Each of the detectors 134, 136 has a central electrode 156, 158 respectively, to equalize the frequency response along the element. The detectors may be fabricated from various materials depending upon the wave band of the coherent radiation or laser. For example, in the visible band silicon p-i-n photodetectors may be used and in the far infrared region $PVF_2$ detectors may be employed.

It will be appreciated that the etalon-detector assembly of FIGS. 12 and 13 may be employed in any one of the embodiment of the invention illustrated in FIGS. 2, 5, 6 and 10, and the signals produced thereby are processed by the electronic elements described in connection therewith.

COHERENCY DETERMINATION

A unique feature of the etalon technique is that it permits sources detected to be classified as coherent or incoherent based solely upon the coherence properties of the source and etalon. This means that a coherency determination can be made substantially independent of the following parameters:

(1) Temporal Characteristics (Source can be very short pulse to CW);

(2) Field Position (source can be located anywhere in a wide field of view, typically 90° and as large as 160°);

(3) Wavelength (source wavelength can be anywhere in the broad spectral region of the receivers. The spectral limits are usually determined by the detector an typically vary from 3:1 to as much as 20:1);

(4) Intensity (source within the dynamic range of the receivers, typically 6 order of magnitude);

(5) Backgrund (A coherent source can be detected in the presence of an ambient incoherent background level. D.C. and slowly varying background components are suppressed electronically. Incoherent background components varying at rates comparable to the coherent source are "nulled out" by a difference technique suppressing them by nominally two orders of magnitude; and (6) The coherent source detection technique is also relatively insensitive to source motion, source tuning and atmospherics.

A means of implementing the technique for detecting the existence of a coherent source in the presence of incoherent background is shown in FIGS. 14A and 14B. It consists of a beam-splitter 160 (or any other suitable common aperture technique) which separates the incident radiation into two components. One component, the "etalon" component, is passed through an etalon 162 to a detector 164 while the other "reference" component is passed through a path compensating device 166 (such as another etalon on a wedged etalon) to a second detector 168. The use of the path compensating device, usually an etalon with sufficient wedge incorporated in it to destroy its coherent modulation characteristics, enables precise balancing of the etalon and reference paths for incoherent light.

The basic concept is to design an optical device and electronic processing that are balanced for incoherent light and unbalanced for coherent light. For incoherent light there will be a sufficient spread of wavelengths so that all the cosine terms in equation (3) will average to zero. The incoherent transmissions of both the etalon and reference then become $\overline{T}_{FP}$ $$\overline{T}_{FP} = T^2/(1-R^2)$$

For coherent sources the wavelength is very nearly monochromatic so that the etalon transmission is given by summing all the terms:

$$T_{FP} = T^2/(1+R^2-2R\cos\phi)$$

However, the transmission of the reference remains $\overline{T}_{FP}$, as the wedge is made to cause the cosine term to go through many cycles and hence average to zero, as before.

The outputs of detectors 164 and 168 are:

$$S_1 = I\overline{T}_{FP1} + B\overline{T}_{FP1}$$

$$S_2 = IT_{FP2} + B\overline{T}_{FP2}$$

where:

I is the intensity of the coherent source.

B is the intensity of the background or other incoherent sources.

$\overline{T}_{FP1}$ is the transmission of the reference wedge for either the coherent source or their incoherent background.

$T_{FP2}$ is the transmission of the etalon for the coherent source.

$\overline{T}_{FP2}$ is the transmission of the etalon for the incoherent background.

There are numerous methods of electronically processing the two signals to detect the presence of a coherent source in the presence of an incoherent background. All such methods have an output state corresponding to balanced inputs and a different state or states that correspond to the existence of unbalanced inputs. (i.e. the presence of a coherent source). Two such methods are shown in FIGS. 14A and 14B.

In FIG. 14A the detector outputs are amplified by amplifiers 170 and 172 to balance out the background. The output of the difference amplifier 174 is:

$$S_2 - S_1 = (T_{FP2} - \overline{T}_{FP1})I + (\overline{T}_{FP2} - \overline{T}_{FP1})B$$

$$= (T_{FP2} - \overline{T}_{FP1})I + \delta B$$

where S is the unadvoidable difference in the two background signals. Typically $\delta$ can be made to be of the order of 0.01. If $\delta$ could be made zero, the presence of a coherent signal could be determined by:

$$|S_2 - S_1| > 0$$

We use the absolute value because $T_{FP2} - \overline{T}_{FP1}$ can be either positive or negative. To compensate for the small unbalances, it is desireable to employ an adoptive threshold proportional to the background, such as $$|S_2 - S_1| > \epsilon S_1$$

This decision is implemented in FIG. 14A by an absolute value circuit 176 and a comparator 178 which compares $|S_2 - S_1|$ to $\epsilon S_1$.

It is readily verified that if $\epsilon$ is chosen such that $$\epsilon > \text{maximum } \delta$$

then incoherent sources will never give a "true" state out of the comparator 178. For coherent sources, there will exist a "true" state out of the comparator except when $T_{FP2} \cong \overline{T}_{FP1}$, which occurs when $\cos\phi \cong R$. This gives small "dead" regions for coherent sources. This is easily avoided by the use of a second optical and electronic channel in quadrature with the first. The use of a quadrature system with the outputs "or" gated together will yield a "true" output or an extremely wide spectral and angular range with no dead regions when a coherent source is present while maintaining a "False" output when only incoherent sources are present.

It is noted that the above balancing technique has the capability of detecting the presence of a coherent source even when there exists incoherent background levels much larger than the coherent signal. A coherence test performed on $S_2$ alone would indicate a substantially incoherent signal while a coherence test on $S_2 - S_1$, which nulls out most of the incoherent signal, will indicate a fairly high level of coherence.

In the foregoing discussions, the signals were indicated as being coherent or incoherent. To be more explicit, what is meant is that a source is:

incoherent if K $(2nd \cos\theta') >> \lambda^2/\pi\Delta\lambda$ coherent if K $(2nd \cos\theta') << \lambda^2/\pi\Delta\lambda$ One can think of $\lambda^2/\pi\Delta\lambda$ as being the coherence length of the source (having center wavelength $\lambda$ and a spectral width of $\Delta\lambda$) and K $(2nd \cos\theta')$ as being the coherence length of the etalon. For low finesse etalons ($R \approx 41\%$), the finesse factor K, is about 10/9. In general, if either of the inequalities is satisfied by a factor of three, the source is for all practical purposes "coherent" or "incoherent".

It is noted that the definition of coherence depends on nd, which is under the control of the designer. By the proper choice of nd, the designer can adjust the coherent/incoherent decision point to have almost any value within reason. A value of the order of 50 $\mu$m is a good choice in the visible region yielding good laser/background discrimination.

In FIG. 14A there has been implemented the decision:

$$|S_2 - S_1| > \epsilon S_1$$

This is equivalent to:

$$\left(\frac{1}{1+\epsilon}\right) S_2 > S_1 \text{ for } S_2 - S_1 > 0$$

$$S_2 < (1-\epsilon)S_1 \text{ for } S_2 - S_1 < 0$$

This logic is implemented in the arrangement of FIG. 14B, which is fully equivalent to the arrangement of FIG. 14A. Because the difference amplifier 174 and the absolute value circuit 176 have been eliminated, this circuitry is simplier, cheaper, and easier to implement, especially at high frequencies. In this embodiment, a first comparator 180 receives the output $S_1$ from the amplifier 172 (FIG. 14A) and the output $S_2$ from the amplifier 170 modified by a constant, as indicated at 182. A second comparator 184 receives the output $S_2$ from the amplifier 170 and the output $S_1$ from the amplifier 172 modified by a constant, as indicated at 186. The outputs from the comparators 180 and 184 are fed to an OR gate 184. As in the case of FIG. 14A, two such channels are usually employed in quadrature and "or"ed together to eliminate dead spots at the zero crossings.

It should be noted that if the comparators are replaced by ratioing elements then an indication of the degree of coherenc of the total signal (coherent source plus background) can be obtained. This has been implemented for the configuration of FIG. 5 and the partial coherence of a $G_aA_s$ laser observed under low background conditions.

It will thus be seen that the present invention does indeed provide new and improved apparatus for detecting and determining the wavelength of a single pulse or a continuus wave of coherent radiation in the presence of incoherent ambient radiation, which is compact and efficient, which has a wide field of view, which has a wide range of radiation coverage, which has high sensitivity, which may determine the relative angular position of the source of radiation, and which is relatively immune to scintillation effects. Because the apparatus according to this invention can detect the characteristics of the radiation from a single pulse, it is particularly useful in applications where there are a plurality of sources of coherent radiation in a given field. Having thus described the invention with particular reference to the preferred forms thereof, it will be obvious to those skilled in the art to which the invention pertains, after understanding the invention that various changes and modifications may be made therein without departing from the spirit and scope of the invention, as defined by the claims appended hereto.

What is claimed is:

1. Apparatus for determining the wavelength of coherent radiation in the presence of incoherent ambient radiation which, in combination, comprises:
   at least three unequal path interferometers with the radiation path length difference in each interferometer being substantially greater than the coherence length of the incoherent radiation, but substatially less than the coherence length of the coherent radiation, the average radiation path length in said three interferometers being different one from the others;
   means for detecting radiation transmitted through each of said interferometers and for generating separate first, second, and third signals corresponding to the radiation leaving each of said interferometers;
   means for processing said signals through electronic signal processing elements to detect and determine the wavelength of the coherent radiation,
   means for equalizing the radiation intensity between pairs of said detecting means.

2. Apparatus for determining the wavelength of coherent radiation in the presence of incoherent ambient radiation according to claim 1 wherein said means for processing said signals through electronic signal processing elements includes analog operative elements.

3. Apparatus for determining the wavelength of coherent radiation in the presence of incoherent ambient radiation according to claim 1 wherein said means for processing said signals through electronic signal processing elements includes digitally operative elements.

4. Apparatus for determining the wavelength of coherent radiation in the presence of incoherent ambient radiation which, in combination, comprises:
   a Fabry-Perot etalon having at least three regions of different thickness, said etalon having a first surface positioned to receive coherent radiation and a second surface, the average distance between said surfaces being such that the radiation path difference between transmitted portions of radiation impinging on said first surface is substantially greater than the coherence length of incoherent radiation but substantially less than the coherence length of the coherent radiation;
   means for detecting radiation transmitted through each of said regions and generating separate first, second and third signals porportional to the intensity of radiation leaving each of said regions; and
   means for processing said signals thorough electronic signal processing elements to detect and determine the wavelength of the coherent radiation,
   means for equalizing the radiation intensity between pairs of said detecting means.

5. Apparatus for determining the wavelength of coherent radiation in the presence of incoherent ambient radiation according to claim 4 further comprising means for rotating said etalon in a predetermined systematic manner, means for detecting a phase difference between the detected signals, and means for determining the direction of the coherent radiation source corresponding to the detected phase difference and the wavelength of the coherent radiation.

6. Apparatus for determining the wavelength of coherent radiation in the presence of incoherent ambient radiation according to claim 4 wherein said means for processing said signals through electronic signal processing elements includes analog operative elements.

7. Apparatus for determining the wavelength of coherent radiation in the presence of incoherent ambient radiation according to claim 4 wherein said means for processing said signals through electronic signal processing elements includes digitally operative elements.

8. Apparatus for determining the wavelength of coherent radiation in the presence of incoherent ambient radiation according to claim 4 wherein said means for processing said signals through electronic signal processing elements includes a comparator associated with each two of said detectors, a plurality of coincident gates associated with said comparators, the number of said gates being one less than the number of comparators, for outputting a plurality-bit wavelength code.

9. Apparatus for determining the wavelength of coherent radiation in the presence of incoherent ambient radiation according to claim 4 wherein said means for equalizing the radiation intensity includes a beam-splitter wherein the radiation entering the beam-splitter is divided so that one portion passes through the beam dividing surface to a first one of said regions of the etalon and a second portion is reflected from the beam dividing surface to a second one of said regions of the etalon.

10. Apparatus for determining the wavelength of coherent radiation in the presence of incoherent ambient radiation according to claim 9 wherein said beam-splitter has a plurality of dots on the beam dividing surface which are highly reflective and the spaces therebetween are highly transmitting, the size of said dots being preselected so that they are smaller than the atmosphere scintillation spatial structure.

11. Apparatus for determining the wavelength of coherent radiation in the presence of incoherent radiation according to claim 4 further comprising common aperture means for directing radiation to said first surface so that the radiation intensities incident on all parts of said surface are substantially the same.

12. Apparatus for detecting a source of coherent radiation in the presence of noncoherent ambient radiation which, in combination, comprises:
  a Fabry-Perot etalon having at least two regions of different thickness, said etalon having a first surface positioned to receive coherent radiation and a second surface, the average distance between said surfaces being such that the optical path difference between transmitted portions of radiation impinging on said first surface is substantially greater than the coherence length of incoherent radiation but substantially less than the coherence length of the coherent radiation; common aperture means for directing radiation to said first surface so that the radiation intensities incident on all parts of said surface are substantially the same;
  means for rotating said Fabry-Perot etalon in a predetermined systematic manner; and
  means for detecting radiation transmitted through each of said regions and generating separate signals proportional to the intensity of radiation leaving each of said regions;
  means for effectively subtracting said separate signals so that any steady background signal components caused by noncoherent radiation in said separate signals are substantially eliminated from the resulting difference signal, while the variable signal components caused by the coherent radiation are effectively added;
  whereby said variable signal component is of almost periodic form but of gradually increasing frequency as the impinging coherent radiation makes an increasing angle of incidence relative to said etalon.

13. Apparatus for detecting a source of coherent radiation in the presence of noncoherent ambient radiation according to claim 12 wherein said common aperture means comprises a beam-splitter having a plurality of dots on the beam dividing surface which are highly reflective and the spaces therebetween are highly transmitting, the size of said dots being preselected so that they are smaller than the atmosphere scintillation spatial structure.

14. Apparatus for detecting a source of coherent radiation in the presence of noncoherent ambient radiation which, in combination, comprises;
  a Fabry-Perot etalon having at least two regions of different thickness, said two regions being formed of a plurality of interdigitated steps, said etalon having a first surface positioned to receive coherent radiation and a second surface, the average distance between said surfaces being such that the optical path difference between transmitted portions of radiation impinging on said first surface is substantially greater than the coherence length of incoherent radiation but substantially less than the coherence length of the coherent radiation;
  means for rotating said Fabry-Perot etalon in a predetermined systematic manner;
  two detector means corresponding to the etalon regions, said detector means having a plurality of interdigitated elements corresponding to the interdigitated steps of the etalon which are adjacent or in contact therewith, said detector means serving to detect the radiation transmitted through each of said regions and generate separate signals proportional to the intensity of radiation leaving each of said regions, the width of said elements being preselected so that they are smaller than the atmosphere scintillation spatial structure;
  means for effectively subtracting said separate signals so that steady background signal components caused by noncoherent radiation in said separate signals are substantially eliminated from the resulting difference signal, while the variable signal components caused by the coherent radiation are effectively added;
  whereby said variable signal component is of almost periodic form but of gradually increasing frequency as the impinging coherent radiation makes an increasing angle of incidence relative to said etalon.

15. Apparatus for determining the wavelength of coherent radiation in the presence of incoherent ambient radiation which comprises;
  a Fabry-Perot etalon having at least three regions of different thickness, said etalon having a first surface positioned to receive coherent radiation and a second surface, the average distance between said surfaces being such that the optical path difference between transmitted portions of radiation impinging on said first surface is substantially greater than the coherence length of incoherent radiation but substantially less than the coherence length of the coherent radiation;
  means for detecting radiation transmitted through each of said regions and generating separate first, second, and third signals proportional to the intensity of radiation leaving each of said regions;
  means for generating a fourth signal proportional to the difference between said first and second signals;
  means for generating a fifth signal proportional to the difference between said second and third signals; and
  means for generating an output proportional to the ratio between said fourth and fifth signals.

16. The apparatus of claim 15 wherein said output generating means comprises: means for generating a sixth signal proportional to said ratio; and means responsive to said sixth signal for generating an output proportional to the arccosine of said ratio.

17. The apparatus of claim 16 wherein said etalon has four regions.

18. The apparatus of claim 17 wherein the optical phase difference between adjacent regions is from approximately 55° to approximately 150°.

19. The apparatus of claim 15 wherein said etalon has four regions.

20. The apparatus of claim 15 wherein the optical phase difference between adjacent regions is from approximately 55° to approximately 150°.

21. The apparatus of claim 15 further comprising common aperture means for directing radiation to said first surface so that the radiation intensities incident on all parts of said surface are substantially the same.

22. The apparatus of claim 21 wherein said common aperture means comprises a beam-splitter having a plurality of dots on the beam dividing surface which are highly reflective and the spaces therebetween being highly transmitting, the size of said dots being preselected so that they are smaller than the atmosphere scintillation spatial structure.

23. Apparatus for detecting a source of coherent radiation in the presence of noncoherent ambient radiation which, in combination, comprises;

a Fabry-Perot etalon having at least three regions of different thickness, said regions being formed of a plurality of interdigitated steps, said etalon having a first surface positioned to receive coherent radiation and a second surface, the average distance between said surfaces being such that the optical path difference between transmitted portions of radiation impinging on said first surface is substantially greater than the coherence length of incoherent radiation but substantially less than the coherence length of the coherent radiation;

a plurality of detector means corresponding in number to the number of etalon regions, said detector means having a plurality of interdigitated elements corresponding to the interdigitated steps of the etalon which are adjacent or in contact therewith, said detector means serving to detect the radiation transmitted through each of said regions and generate separate signals proportional to the intensity of radiation leaving each of said regions, the width of said elements being preselected so that they are smaller than the atmosphere scintillation spatial structure; and means for processing said signals through electronic signal processing elements to detect and determine the wavelength of the coherent radiation.

24. The apparatus of claim 23 wherein said means for processing said signals through electronic signal processing elements includes a comparator associated with each two of said detectors means, a plurality of coincident gates associated with said detector means, the number of said gates being one less than the number of detector means, for outputting a plurality-bit wavelength code.

25. Apparatus for determining the wavelength of coherent radiation in the presence of incoherent ambient radiation which, in combination, comprises;

a Fabry-Perot etalon having eight regions of different thickness, said etalon having a first surface positioned to receive coherent radiation and a second surface, the average distance between said surfaces being such that the optical path difference between transmitted portions of radiation impinging on said first surface is substantially greater than the coherence length of incoherent radiation but substantially less than the coherence length of the coherent radiation;

means for detecting radiation transmitted through each of said regions and generating first, second, third, fourth, fifth sixth, seventh and eighth signals proportional to the intensity of radiation leaving each of said regions;

said first and eighth signals being applied to a first comparator means to determine the polarity thereof, said second and seventh signals being applied to a second comparator means to determine the polarity thereof, said third and sixth signals being applied to a third comparator means to determine the polarity thereof, and said fourth and fifth signals being applied to a fourth comparator means to determine the polarity thereof; and the outputs from the first and second comparator means being connected to a first coincidence gate means, the outputs from said second and third comparator means being connected to a second coincident gate means, and the outputs from said third and fourth comparator means being connected to a third coincident gate means, said coincident gate means serving to compute a three-bit wavelength code.

26. Apparatus for determining the wavelength of coherent radiation in the presence of incoherent ambient radiation according to claim 25 wherein the thicknesses of said regions are preselected so that polarity reversals occur at different wavelengths, to thereby provide a binary code for the wavelength of the coherent radiation.

27. Apparatus for determining the wavelength of coherent radiation in the presence of incoherent ambient radiation according to claim 25 further comprising common aperture means for directing radiation to said first surface so that the radiation intensities incident on all parts of said surface are substantially the same.

28. The apparatus of claim 27 wherein said common aperture means comprises a beam-splitter having a plurality of dots on the beam dividing surface which are highly reflective and the space therebetween being highly transmitting, the size of said dots being preselected so that they are smaller than the atmosphere scintillation spatial structure.

* * * * *